H. COOPER.
UNIVERSAL JOINT.
APPLICATION FILED FEB. 13, 1918.
1,368,607.
Patented Feb. 15, 1921.
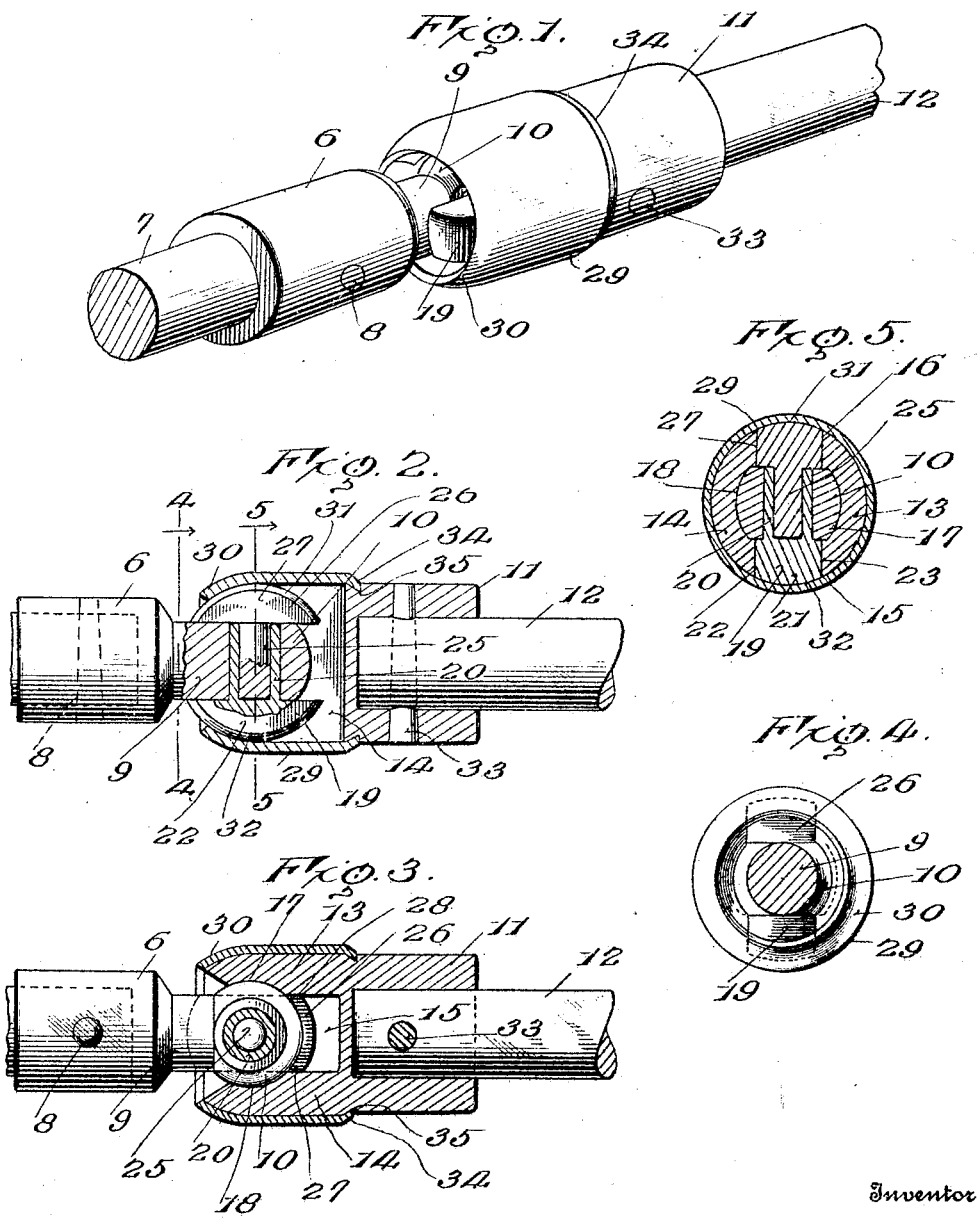

UNITED STATES PATENT OFFICE.

HERBERT COOPER, OF BROOKLYN, NEW YORK.

UNIVERSAL JOINT.

1,368,607.  Specification of Letters Patent.  Patented Feb. 15, 1921.

Application filed February 13, 1918. Serial No. 216,919.

*To all whom it may concern:*

Be it known that I, HERBERT COOPER, a citizen of the United States, residing at Brooklyn, in the county of Kings and State of New York, have invented certain new and useful Improvements in Universal Joints, of which the following is a specification.

This invention relates to universal joints, and more particularly to that class of such devices especially adapted for the efficient transmission of power, and has for its essential object the construction of a universal joint of the character set forth adapted to deliver power transmitted thereto in a direction away from a straight line or in any driving angle with maximum efficiency and with minimum friction, wear or strain.

A further object of this invention is the provision of a universal joint embodying an improved construction especially adapted for the coupling together of the drive shaft and the propeller shaft of an automobile, the universal coupling means possessing peculiar advantages of operation for the construction for which it is designed to permit of movement in any driving angle to any desired amount.

With the foregoing and other objects in view as will from time to time hereinafter appear, this invention consists in the peculiar arrangement and combination of the various coöperating and related elements of a universal joint as further set forth in the following specification and more particularly pointed out in the appended claims.

Referring to the accompanying drawings forming a portion of this specification and illustrating the preferred embodiment of the invention, and in which the same reference characters are used to designate the same parts throughout, Figure 1 is a perspective view of the joint with a portion of each shafting attached thereto;

Fig. 2 is a detail vertical section through the joint;

Fig. 3 is a detail horizontal section through the joint;

Fig. 4 is a section on line 4, 4 of Fig. 2;

Fig. 5 is a section on line 5, 5 of Fig. 2.

6 designates a cylindrical member hollowed out to receive a shaft 7 held in place therein by a tapered pin 8 driven through apertures suitably provided in the member 6 and the shaft 7, the member 6 being further provided with a reduced extension 9 terminating in an eye portion 10 flattened upon parallel sides and rounded to form the ball of a ball and socket universal joint as hereinafter described.

A second cylindrical member 11 is similarly hollowed out for the reception of a shaft 12, the member 11 having two parallel extensions 13, 14, separated by parallel longitudinal slots 15, 16, the extensions 13, 14 being cut away interiorly at 17, 18, to form a socket for the ball member previously described.

In assembling the universal joint the eye 10 of the member 6 is inserted between the extensions through the slot 15 or 16 as the case may be, and then turned upon its axis, so that the eye 10 will aline with the slots 15, 16, and the ball portion of the eye 10 will engage the socket formed by the cut away portions 17, 18. While in this position a member 19, comprising a hollow shank 20 and a head 21, flattened at the sides 22, 23 thereof to fit the slot 15, is inserted through the slot 15, the shank 20 entering the eye 10.

A second member 24 somewhat similar to the member 19 and coöperating therewith is inserted through the opposite slot 16. A shank 25 thereof enters or telescopes with the hollow shank 20 of the member 19 in the center of the eye 10. Head 26 of the member 24 is within the slot 16 and is flattened at 27, 28, in order to fit the slot as shown in Fig. 5.

When the assembled parts are in this position a suitable casing 29 provided with a curved lip 30 is slid into the position shown upon the member 11, the curved lip 30 engaging the heads 21 and 26 of the members 19, 24, which are curved transversely at 31, 32, to fit the interior periphery of the lip 30. The casing 29 is held in place by spinning or pressing end 34 into groove 35 suitably provided in member 11. The shaft 12 is held in place by a taper pin 33 engaging suitable apertures bored for the purpose in the member 11 and the shaft 12.

By the construction above described any movement in one plane is provided for by the movement of the eye 10 within the socket formed by the cut away portions 17 and 18, wherein the eye 10 pivots vertically upon the shank 20 of the member 19, which member is held from vertical movement by its location within the slot 15, as is also the member 24 located in the slot 16.

Movement of the shafting in the other plane is provided for by the members 19 and 24 within their respective slots 15 and 16, the curved surfaces 31 and 32 of the said members forming a ball and socket joint with the interior of the lip 30 of the casing 29.

By providing for the two out of line movements above described the device presents a universal joint permitting of a varied movement of the driven shaft carried thereby.

I realize that considerable variation of the specific details of the device herein shown and described may be resorted to without departing from the spirit of my invention, and it is therefore my intention not to limit myself to the precise construction illustrated but to construe the following claims as broadly as the state of the prior art will define the scope thereof.

What I claim is:

1. In a universal joint, a socket member having extensions at opposite sides, a ball member engaging said socket member between said extensions, holding means carried by said ball member adapted to lie between the sides of said extensions to retain said ball member within said socket, and means adapted to retain said ball retaining means in position.

2. In a universal joint, a member having extensions separated by slots and forming a socket, a ball member adapted to engage said socket, the ball member being provided with an eye, a plurality of members adapted to engage said eye and said slots to hold said ball in the socket, and means for retaining said members in said slots.

3. In a universal joint, a socket member having slots, a ball member adapted to engage the socket, members adapted to engage said ball member and said slots to permit horizontal and vertical movement of said ball and to prevent the rotation of the ball within the socket, and means for holding the ball retaining members in position.

4. In a universal joint, a socket member having oppositely disposed slots, a ball member, and telescopic means carried by the ball member adapted to engage the slots in the socket member to permit horizontal and vertical angular movement of the ball within the socket but to prevent rotation therein.

5. In a universal joint, a member having extensions separated by slots and forming a socket, a ball member adapted to engage said socket, the ball member being provided with an eye, a plurality of members adapted to engage said eye and said slots to hold said ball in the socket, a tubular member adapted for retaining said members in said slots and means for attaching said tubular member to said socket member.

6. In a universal joint, a socket member having slots, a ball member adapted to engage the socket, means adapted to engage said ball member and said slots to permit vertical and horizontal movement of said ball and to prevent the rotation of the ball within the socket, a tubular member adapted for holding the ball retaining members in position and means for holding said tubular member in position on said socket member.

7. In a universal joint, a socket member having extensions separated by slots, a ball member adapted to engage said socket member, a plurality of members to engage said ball member and said slots to permit horizontal and vertical angular movement of the ball within the socket but to prevent axial rotation therein, a tubular member adapted to hold said members in said slots and means for holding tubular member in position.

In testimony whereof I affix my signature in presence of two witnesses.

HERBERT COOPER

Witnesses:
 E. A. MORRISON,
 ANDREW STARKE.